(12) United States Patent
Yoon

(10) Patent No.: US 12,269,497 B2
(45) Date of Patent: Apr. 8, 2025

(54) DRIVER ASSISTANCE SYSTEM AND DRIVER ASSISTANCE METHOD

(71) Applicant: HL KLEMOVE CORP., Incheon (KR)

(72) Inventor: Taesik Yoon, Siheung-si (KR)

(73) Assignee: HL KLEMOVE CORP., Incheon (KR)

( * ) Notice: Subject to any disclaimer, the term of this patent is extended or adjusted under 35 U.S.C. 154(b) by 68 days.

(21) Appl. No.: 18/106,010

(22) Filed: Feb. 6, 2023

(65) Prior Publication Data

US 2023/0249707 A1 Aug. 10, 2023

(30) Foreign Application Priority Data

Feb. 4, 2022 (KR) .................. 10-2022-0014678

(51) Int. Cl.
*B60W 50/14* (2020.01)
*G06V 20/58* (2022.01)

(52) U.S. Cl.
CPC ............ *B60W 50/14* (2013.01); *G06V 20/584* (2022.01); *B60W 2050/143* (2013.01); *B60W 2050/146* (2013.01); *B60W 2554/80* (2020.02)

(58) Field of Classification Search
CPC ............. B60W 50/14; B60W 2554/80; B60W 2050/143; B60W 2050/146; G06V 20/584
USPC .................................................. 340/425.5
See application file for complete search history.

(56) References Cited

U.S. PATENT DOCUMENTS

| | | | | |
|---|---|---|---|---|
| 9,164,511 | B1* | 10/2015 | Ferguson | G05D 1/0088 |
| 2015/0148985 | A1* | 5/2015 | Jo | B60W 30/095 |
| | | | | 701/1 |
| 2016/0362105 | A1* | 12/2016 | Kwon | G01C 21/26 |
| 2017/0160743 | A1* | 6/2017 | Schweikl | G06V 20/584 |
| 2018/0012088 | A1* | 1/2018 | Matsuo | G08G 1/09623 |
| 2020/0026935 | A1* | 1/2020 | Hayashi | G06V 20/582 |
| 2021/0139025 | A1* | 5/2021 | Kim | B60W 30/0956 |
| 2021/0162992 | A1* | 6/2021 | Ikezawa | B60W 30/18154 |
| 2021/0279481 | A1* | 9/2021 | Son | G08G 1/0116 |
| 2021/0284153 | A1* | 9/2021 | Baek | B60W 50/14 |
| 2021/0323550 | A1* | 10/2021 | Choi | B60W 50/14 |
| 2023/0114577 | A1* | 4/2023 | Sameer | G06N 20/00 |
| | | | | 340/436 |

FOREIGN PATENT DOCUMENTS

KR 10-2016-0121065 A 10/2016
KR 10-2021-0071454 A 6/2021

* cited by examiner

*Primary Examiner* — Zhen Y Wu
(74) *Attorney, Agent, or Firm* — Hauptman Ham, LLP

(57) ABSTRACT

Disclosed herein is a vehicle driving assistance apparatus including a camera which is installed in a vehicle, has a front field of view of the vehicle, and acquires image data, and a controller configured to process the image data, wherein the controller may detect a vehicle parked and stopped to face a driving direction of the vehicle based on the processed image data, and upon detecting the parked vehicle, the controller may generate a control signal to provide a notification to a driver.

16 Claims, 9 Drawing Sheets

DRIVER ASSISTANCE SYSTEM AND DRIVER ASSISTANCE METHOD

CROSS-REFERENCE TO RELATED APPLICATION

This application is based on and claims priority under 35 U.S.C. § 119 to Korean Patent Application No. 10-2022-0014678, filed on Feb. 4, 2022 in the Korean Intellectual Property Office, the disclosure of which is incorporated herein by reference.

BACKGROUND

1. Field

Embodiments of the present disclosure relate to a driver assistance system and a driver assistance method, and more particularly, to a driver assistance system for providing a notification of a signal violation warning to a driver, and a driver assistance method.

2. Description of the Related Art

Vehicles are apparatuses capable of transporting people or goods to a destination while traveling on a road or a track. A vehicle can move to various positions using one or more wheels installed on a vehicle body. Such a vehicle may include a three- or four-wheeled vehicle, a two-wheeled vehicle such as a motorcycle, a construction machine, a bicycle, or a train running on a rail disposed on a track.

Recently, in order to reduce a driver's burden and improve convenience, research on vehicles equipped with an advanced driver assist system (ADAS) that actively provides information about a vehicle state, a driver condition, and a surrounding environment has been actively conducted.

In general, there are many cases in which a driver needs to stop at an intersection while driving a vehicle. In this case, when there is a large vehicle such as a truck or bus in front of his or her vehicle or when a front field of view is poor due to fog or the like, a driver is placed in a situation in which the driver cannot see a traffic light.

In this case, a driver may not be able respond to a change of the traffic light and may unintentionally violate a traffic signal at an intersection or the like or may have an unexpected accident while following a preceding vehicle.

In addition, due to a sudden change of a traffic light or a poor field of view, there have been problems that a driver cannot properly respond to the change of the traffic light and thus may be fined for a signal violation, and in more severe cases, the driver has an accident.

SUMMARY

Therefore, it is an aspect of the present disclosure to provide a driver assistance system which, when a field of view with respect to a traffic light is blocked, provides a notification to a driver to deal with a signal violation, and a driver assistance method.

Additional aspects of the disclosure will be set forth in part in the description which follows and, in part, will be obvious from the description, or may be learned by practice of the disclosure.

In accordance with one aspect of the present disclosure, a driver assistance system includes a front camera configured to detect a preceding vehicle, and a controller configured to determine whether a traffic light ahead is present based on the road information received from a navigation device installed in a host vehicle, determine a height of the preceding vehicle and a distance from a host vehicle to the preceding vehicle based on a detection result of the front camera, determine a viewing angle blocked by the preceding vehicle based on the determined height of the preceding vehicle and the distance from the host vehicle to the preceding vehicle, and determine whether a field of view with respect to the traffic light ahead is blocked based on the traffic light ahead being present and the viewing angle blocked by the preceding vehicle.

The driver assistance system may further include a first sensor configured to detect a relative speed with the preceding vehicle, wherein, upon determining that the field of view with respect to the traffic light ahead is blocked, based on the relative speed with the preceding vehicle detected by the first sensor being constant or decreased, the controller may provide a notification to a driver.

The driver assistance system may further include a speaker, and a display, wherein the controller may control the speaker or the display to provide the notification to the driver.

The driver assistance system may further include a second sensor configured to detect vehicles at both sides of the host vehicle, wherein the controller may determine whether the vehicles at both sides of the host vehicle are stopped based on a detection result of the second sensor.

Upon determining that the vehicles at both sides of the host vehicle are stopped, the controller may control the host vehicle to be stopped.

Upon determining that the vehicles at both sides of the host vehicle are not stopped, the controller may provide the notification to the driver.

The controller may determine a height of the preceding vehicle based on an installation height of the front camera and a top of the preceding vehicle detected by the front camera.

Based on a height of the preceding vehicle being greater than or equal to a preset value, the controller may determine the viewing angle in the host vehicle. The preset value may be 2 m.

Upon determining that the field of view with respect to the traffic light ahead is blocked, the controller may control the host vehicle to be stopped.

In accordance with one aspect of the present disclosure, a driver assistance method including receiving road information, detecting a preceding vehicle, determining whether a traffic light ahead is present based on the received road information, determining a height of the preceding vehicle and a distance from a host vehicle to the preceding vehicle based on a result of detecting the preceding vehicle, determining a viewing angle in the host vehicle based on the determined height of the preceding vehicle and the determined distance from the host vehicle to the preceding vehicle, and determining whether a field of view with respect to the traffic light ahead is blocked based on the traffic light ahead being present and the viewing angle in the host vehicle.

The driver assistance method may further include detecting a relative speed with the preceding vehicle, and upon determining that the field of view with respect to the traffic light ahead is blocked, based on the relative speed with the preceding vehicle being constant or decreased, providing a notification to a driver The providing of the notification to the driver may include controlling a speaker or a display to provide the notification to the driver.

The driver assistance method may further include detecting vehicles at both sides of the host vehicle, and determining whether the vehicles at both sides of the host vehicle are stopped based on a result of detecting the vehicles at both sides of the host vehicle.

The driver assistance method may further include, upon determining that the vehicles at both sides of the host vehicle are stopped, controlling the host vehicle to be stopped.

The driver assistance method may further include, upon determining that the vehicles at both sides of the host vehicle are not stopped, providing the notification to the driver.

The determining of the height of the preceding vehicle may include determining the height of the preceding vehicle based on an installation height of a front camera and a top of the preceding vehicle detected by the front camera.

The driver assistance method may further include, based on the determine height of the preceding vehicle being greater than or equal to a preset value, determining the viewing angle in the host vehicle.

The driver assistance method may further include, upon determining that the traffic light ahead is blocked, controlling the host vehicle to be stopped.

In accordance with one aspect of the present disclosure, a driver assistance system includes a front camera configured to detect a preceding vehicle; and a controller configured to determine whether a traffic light ahead is present based on road information received from a navigation device installed in a host vehicle, determine a viewing angle blocked by the preceding vehicle based on a detection result of the front camera, and determine whether a field of view of the traffic light ahead is blocked based on whether the traffic light ahead is present and the viewing angle blocked by the preceding vehicle.

Upon determining that the field of view with respect to the traffic light ahead is blocked, the controller may provide a notification to a driver.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
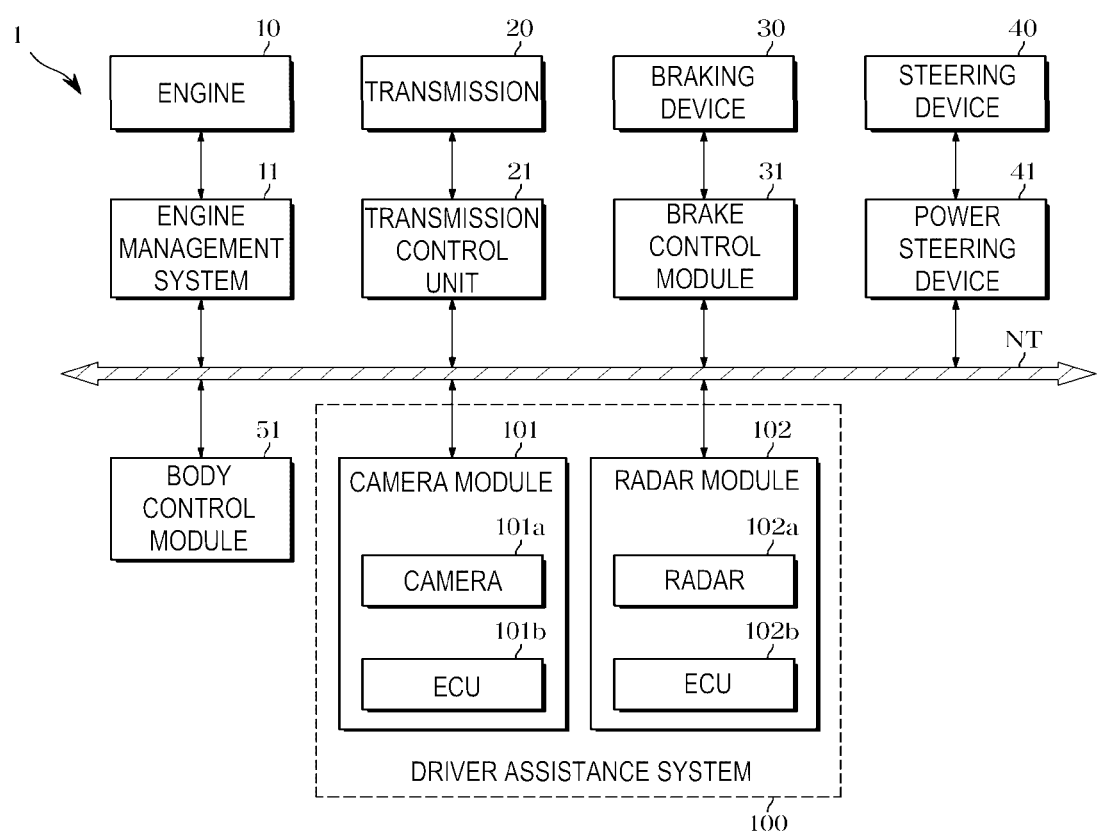
FIG. 1 illustrates a configuration of a vehicle according to one embodiment.

Like reference numerals refer to like elements throughout the specification. Not all elements of embodiments of the present disclosure will be described, and description of what are commonly known in the art or what overlap each other in the embodiments will be omitted. The terms as used throughout the specification, such as "part," "module," "member," "block," and the like may be implemented in software and/or hardware, and a plurality of "parts," "modules," "members," or "blocks" may be implemented in a single element, or a single "part," "module," "member," or "block" may include a plurality of elements.

It will be understood that when an element is referred to as being "connected" another element, it can be directly or indirectly connected to another element, wherein the indirect connection includes "connection via a wireless communication network."

When a part "includes" or "comprises" an element, unless there is a particular description contrary thereto, the part may further include other elements, not excluding the other elements.

Throughout the present specification, the term "on" that is used to designate a position of one element with respect to another element includes both a case that the one element is adjacent to the another element and a case that any other element exists between these two elements.

The terms "first," "second," and the like are used to differentiate a certain element from another element, but elements should not be construed to be limited by the terms.

A singular expression includes a plural expression unless the context clearly indicates otherwise.

An identification code is used for convenience of the description but is not intended to illustrate the order of operations. The operations may be implemented in the order different from the illustrated order unless the context clearly indicates otherwise.

The principle and embodiments of the present disclosure will now be described with reference to the accompanying drawings.

FIG. 1 illustrates a configuration of a vehicle according to one embodiment.

As shown in FIG. 1, a vehicle 1 includes an engine 10, a transmission 20, a braking device 30, and a steering device 40. The engine 10 may include a cylinder and a piston and may generate power for driving the vehicle 1. The transmission 20 may include a plurality of gears and may transmit power generated by the engine 10 to wheels. The braking device 30 may decelerate or stop the vehicle 1 through friction with the wheels. The steering device 40 may change a driving direction of the vehicle 1.

The vehicle 1 may include a plurality of electronic components. For example, the vehicle 2 may include an engine management system (EMS), a transmission control unit (TCU) 21, an electronic brake control module (31), an electronic power steering (EPS) device 41, a body control module (BCM), a driver assistance system (DAS) 100, and a user interface 200.

The EMS 11 may control the engine 10 in response to an acceleration intention of a driver through an accelerator pedal or a request from the DAS 100. For example, the EMS 11 may control torque of the engine 10.

The EMS 11 performs fuel injection control, fuel efficiency feedback control, lean combustion control, ignition timing control, idle RPM control, and the like. The EMS 11 may be provided as a single device or may be provided as a plurality of devices connected through communication.

The TCU 21 may control the transmission 20 in response to a shift command of a driver through a shift lever and/or a driving speed of the vehicle 1. For example, the TCU 21 may adjust a transmission ratio from the engine 10 to the wheels.

The electronic brake control module 31 may control the braking device 30 in response to a braking intention of a driver through a brake pedal and/or slip of the wheels. For example, the electronic brake control module 31 may temporarily release braking of the wheel in response to slip of the vehicles detected during braking of the vehicle 1 (antilock braking system (ABS)). The electronic brake control module 31 may selectively release braking of the wheel in response to oversteering and/or understeering detected during steering of the vehicle 1 (electronic stability control (ESC)). In addition, the electronic brake control module 31 may temporarily brake the wheel in response to slip of the wheel detected during driving of the vehicle 1 (traction control system (TCS)).

The EPS device 41 may assist with the operation of the steering device 40 in response to a steering intention of a user through a steering wheel such that the driver may easily operate the steering wheel. For example, the EPS device 41 may assist with the operation of the steering device 40 to reduce a steering force during low-speed driving or parking and may increase a steering force during high-speed driving.

A BCM 51 may control the operation of the electronic components which provide convenience to a driver or ensure the safety of the driver. For example, the BCM 51 may control head lamps, wipers, clusters, multi-function switches, and direction indicator lamps.

The DAS 100 may assist the driver in operating (driving, braking, and steering) the vehicle 1. For example, the DAS 100 detects an environment of a road on which the vehicle 1 is traveling (for example, other vehicles, pedestrians, cyclists, lanes, road signs, traffic lights, or the like) and may control driving and/or braking and/or steering of the vehicle 1 based on the detected environment.

The DAS 100 may provide various functions to a driver. For example, the DAS 100 may provide a lane departure warning (LDW), lane keeping assist (LKA), high beam assist (HBA), autonomous emergency braking (AEB), traffic sign recognition (TSR), smart cruise control (SCC), blind spot detection (BSD), and the like.

The DAS 100 includes a camera module 101 which acquires image data around the vehicle 1 and a radar module 102 which acquires object data around the vehicle 1. The camera module 101 may include a camera 101*a* and a controller (electronic control unit (ECU)) 101*b* and may photograph a view in front of the vehicle 1 and recognize other vehicles, pedestrians, cyclists, lanes, road signs, traffic lights, or the like. The radar module 102 may include a radar 102*a* and a controller 102*b* and may acquire a relative position, a relative speed, or the like of objects (for example, other vehicles, pedestrians, cyclists, or the like) around the vehicle 1.

That is, the DAS 100 may process image data acquired by the camera module 101 and detection data (radar data) acquired by the radar module 102 and may detect an environment of a road on which the vehicle 1 is driving, a front object positioned in front of the vehicle 1, and a vehicle positioned in a lateral direction of the vehicle 1 based on the processed image data and radar data.

The present invention is not limited to that shown in FIG. 1, the DAS 100 may further include a laser induced detection and ranging (LiDAR) sensor which scans a periphery of the vehicle 1 and detects an object.

The above electronic components may communicate with each other through a vehicle communication network (NT). For example, the electronic components may exchange data through Ethernet, media oriented systems transport (MOST), FlexRay, a controller area network (CAN), or a local interconnect network (LIN). For example, the DAS 100 may transmit a driving control signal, a braking signal, and a steering signal to the EMS 11, the electronic brake control module 31, and the EPS device 41 through the vehicle communication network (NT), respectively.

Figure 2:
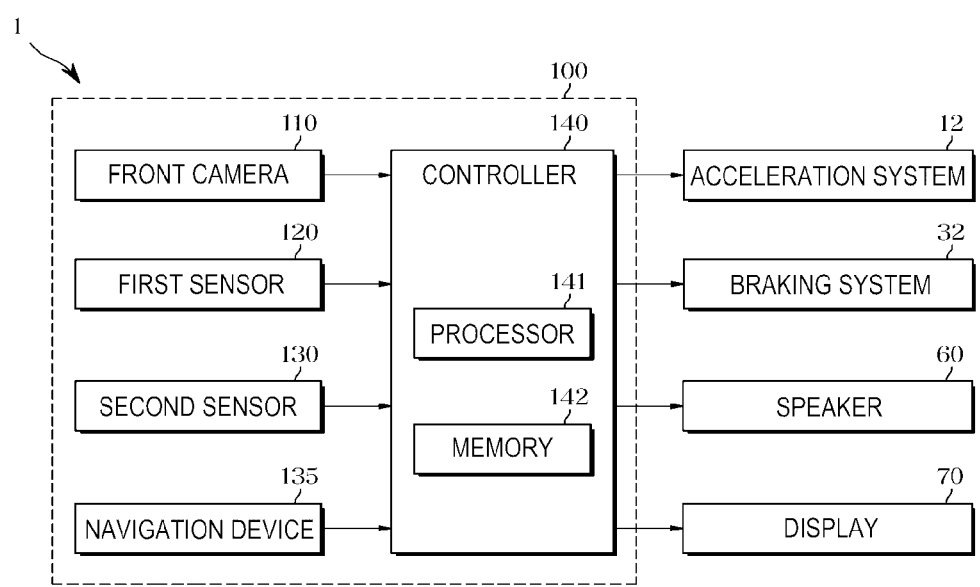
FIG. 2 illustrates a configuration of a driver assistance system according to one embodiment.
Figure 3:
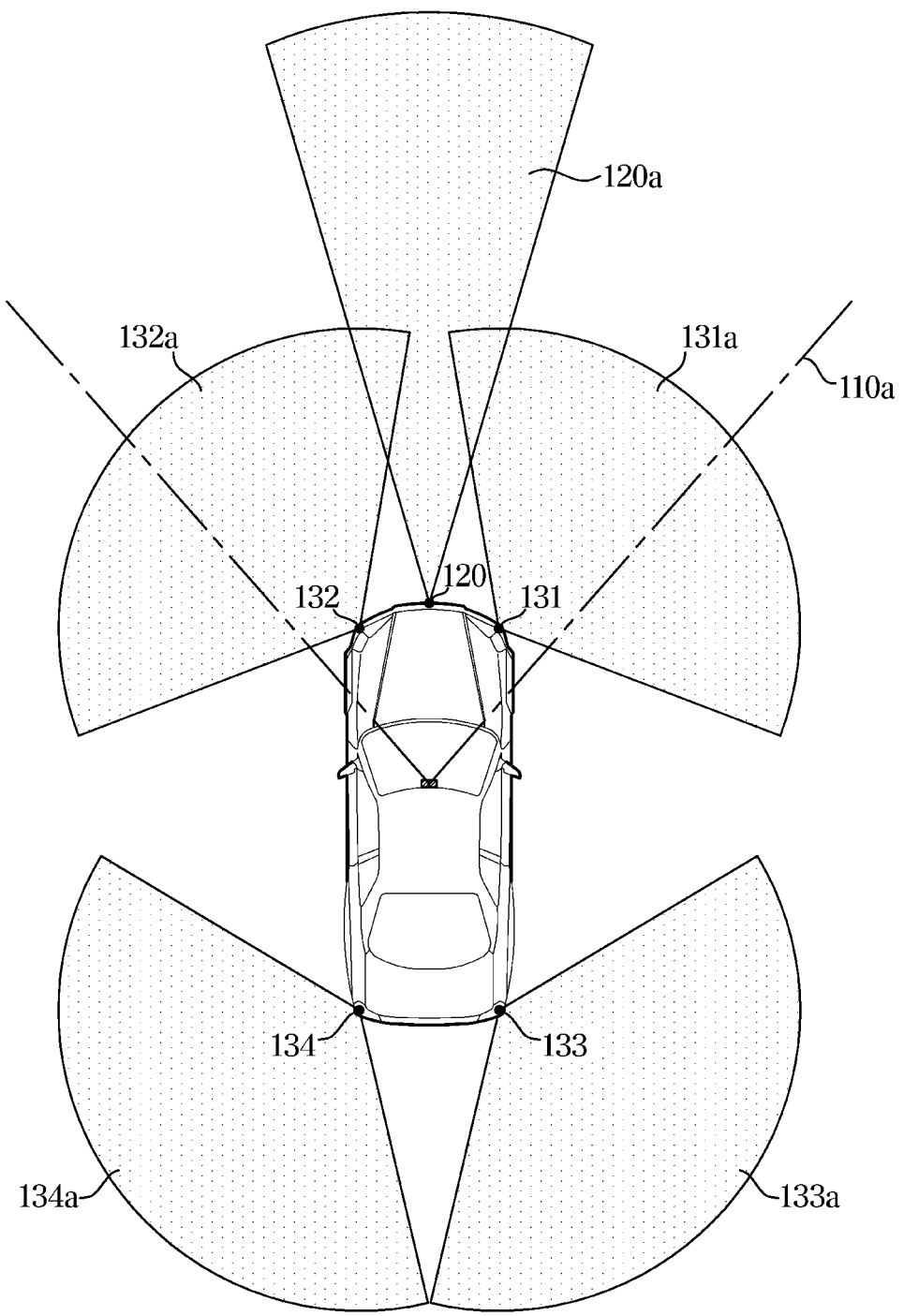
FIG. 3 illustrates cameras and radars included in the driver assistance system according to one embodiment.

FIG. 2 illustrates a configuration of a DAS according to one embodiment, and FIG. 3 illustrates cameras and radars included in the DAS according to one embodiment.

As shown in FIG. 2, a vehicle 1 may include an acceleration system 12, a braking system 32, a speaker 60, a display 70, and a DAS 100.

The acceleration system 12 may include an EMS 11 (see FIG. 1) and an engine 10 (see FIG. 1) described with reference to FIG. 1, and the braking system 32 may include an electronic brake control module 31 (see FIG. 1) and a braking device 30 (see FIG. 1). The speaker 60 and the display 70 may provide a notification to a driver in the form of voice and an image.

The DAS 100 may include a front camera 110, a first sensor 120, and a second sensor 130.

As shown in FIG. 3, the front camera 110 may include a field of view 110*a* facing forward from the vehicle 1. The front camera 110 may be installed, for example, on a front windshield of the vehicle 1.

The front camera 110 may photograph a view in front of the vehicle 1 and may acquire image data of the view in front of the vehicle 1.

The front camera 110 may include a plurality of lenses and an image sensor. The image sensor may include a plurality of photodiodes that convert light into an electrical signal, and the plurality of photodiodes may be disposed in a two-dimensional matrix.

The front camera 110 may be electrically connected to a controller 140. For example, the front camera 110 may be connected to the controller 140 through a vehicle communication network (NT), may be connected to the controller 140 through a hard wire, or may be connected to the controller 140 through a printed circuit board (PCB).

Accordingly, the front camera 110 may transfer the image data of the view in front of the vehicle 1 to the controller 140.

As shown in FIG. 3, the first sensor 120 may have a field of sensing 120*a* facing forward from the vehicle 1. The first sensor 120 may be installed, for example, on a grill or bumper of the vehicle 1. The first sensor 120 may be provided in the form of a radar.

The first sensor 120 may include a transmitting antenna (or a transmitting antenna array) for radiating transmission radio waves forward from the vehicle 1, and a receiving antenna (or a receiving antenna array) for receiving reflected radio waves reflected from an object. The first sensor 120 may acquire first sensor data from a transmission wave transmitted by the transmitting antenna and a reflected wave received by the receiving antenna. The first sensor data may include distance information and speed information related to other vehicles, pedestrians, or cyclists positioned in front of the vehicle 1. The speed information may include both lateral speed information and longitudinal speed information. The first sensor 120 may calculate a relative distance to an object based on a phase difference (or time difference) between a transmission radio wave and a reflected radio wave and may calculate a relative speed of the object based on a frequency difference between the transmission radio wave and the reflected radio wave.

The first sensor 120 may be connected to the controller 140 through, for example, the vehicle communication network (NT), a hard wire, or a PCB. Accordingly, the first sensor 120 may transfer the first sensor data to the controller 140.

In addition, the DAS 100 may further include a second sensor 130, and the second sensor 130 may be provided in the form of a plurality of corner radars.

The second sensor 130 may include a first corner radar 131 installed at a front right side of the vehicle 1, a second corner radar 132 installed at a front left side of the vehicle 1, a third corner radar 133 installed at a rear right side of the vehicle 1, and a fourth corner radar 134 installed at a rear left side of the vehicle 1.

As shown in FIG. 3, the first corner radar 131 may have a field of sensing 131*a* facing a front-right direction of the vehicle 1. The first corner radar 131 may be installed, for example, at a right side of a front bumper of the vehicle 1. The second corner radar 132 may have a field of sensing 132*a* facing a front-left direction of the vehicle 1 and may be installed, for example, at a left side of the front bumper of the vehicle 1. The third corner radar 133 may have a field of sensing 133*a* facing a rear-right direction of the vehicle 1 and may be installed, for example, at a right side of a rear bumper of the vehicle 1. The fourth corner radar 134 may have a field of sensing 134*a* facing a rear-left direction of the vehicle 1 and may be installed, for example, at a left side of the rear bumper of the vehicle 1.

Each of the first, second, third, and fourth corner radars 131, 132, 133, and 134 may include a transmitting antenna and a receiving antenna. The first, second, third, and fourth corner radars 131, 132, 133, and 134 may acquire first corner radar data, second corner radar data, third corner radar data, and fourth corner radar data, respectively. The first corner radar data may include distance information and speed information related to other vehicles, pedestrians, or cyclists (hereinafter referred to as "objects") positioned in the front-right direction of the vehicle 1. The second corner radar data may include distance information and speed information related to objects positioned in the front-right direction of the vehicle 1. The third corner radar data and the fourth corner radar data may include distance information and relative speed of objects positioned in the rear-right direction of the vehicle 1 and the rear-left direction of the vehicle 1.

Each of the first, second, third, and fourth corner radars 131, 132, 133, and 134 may be connected to the controller 140 through, for example, the vehicle communication network (NT), a hard wire, or a PCB. The first, second, third, and fourth corner radars 131, 132, 133, and 134 may transmit the first corner radar data, the second corner radar data, the third corner radar data, and the fourth corner radar data to the controller 140, respectively.

A navigation device 165 may receive road information. For example, the navigation device 165 may receive information about whether a traffic light is present in front of the vehicle 1.

The controller 140 may include a controller 101*b* (see FIG. 1) of a camera module 101 (see FIG. 1), a controller 102*b* (see FIG. 1) of a radar module 102 (see FIG. 1), and/or a separate integrated controller.

The controller 140 may include a processor 141 and a memory 142.

The processor 141 may process front image data of the front camera 110, the first sensor data of the first sensor 120, and the second sensor data of the second sensor 130 and may generate signals for controlling the acceleration system 12, the braking system 32, the speaker 60, and the display 70. For example, the processor 141 may include an image processor which processes front image data of the front camera 110, a digital signal processor which processes radar data of the first sensor 120 and radar data of the second sensor 130, and/or a micro control unit (MCU) which generates a driving signal and a braking signal.

The processor 141 may recognize objects (for example, a preceding vehicle) in front of the vehicle 1 based on the front image data of the front camera 110 and the first sensor data of the first sensor 120.

Specifically, based on the front image data of the front camera 110, the processor 141 may obtain positions (directions), type information, and/or lane information related to objects in front of the vehicle 1.

In addition, the processor 141 may match objects detected based on the front image data with objects detected based on the first sensor data and may obtain type information, positions, and relative speeds of the objects in front of the vehicle 1 based on matching results.

When a preceding vehicle is recognized from the front image data and/or the first sensor data, the processor 141 may select the recognized preceding vehicle as a target vehicle.

In this case, when the preceding vehicle recognized from the front image data matches the preceding vehicle recognized from the first sensor data, the processor 141 may select the preceding vehicle as the target vehicle.

Then, the processor 141 may maintain a distance between the vehicle 1 and the target vehicle by controlling the acceleration system 12, the braking system 32, and the steering system 42.

For example, when the distance between the vehicle 1 and the target vehicle is longer than a preset distance, the processor 141 may control the acceleration system 12 to accelerate the vehicle 1.

That is, the processor 141 may control a speed of the vehicle 1 to follow the target vehicle, and in this case, the processor 141 may determine acceleration required for following the target vehicle and may control the acceleration system 12 and/or the braking system 32 to increase acceleration of the vehicle 1 to the required acceleration.

Also, the processor 141 may acquire information about objects at both sides of the vehicle 1 based on the second sensor data of the second sensor 130. For example, based on the second sensor data, the processor 141 may determine whether a vehicle is present or stopped at both sides of the vehicle 1.

The memory 142 may store programs and/or data for processing image data by the processor 141, programs and/or data for processing radar data by the processor 141, and programs and/or data for generating a driving signal and/or a braking signal by the processor 141.

The memory 142 may temporarily store image data received from the front camera 110 and/or radar data received from the second sensor 130 and may temporarily store processing results of image data and/or radar data by the processor 141.

Examples of the memory 142 may include not only volatile memories such as a static random access memory (SRAM) and a dynamic random access memory (DRAM) but also non-volatile memories such as a flash memory, a read only memory (ROM), and an erasable programmable read only memory (EPROM), and the like.

The present disclosure is not limited to that shown in FIG. 2, the DAS 100 may further include a laser induced detection and ranging (LiDAR) sensor which scans a periphery of the vehicle 1 and detects an object.

Hereinafter, radar data obtained from a radar and LiDAR data obtained from a LiDAR sensor will be collectively referred to as detection data, and based on the configuration of the vehicle 1 and the configuration of the DAS 100 described above, a driver assistance method according to one embodiment will be described.

Figure 4:
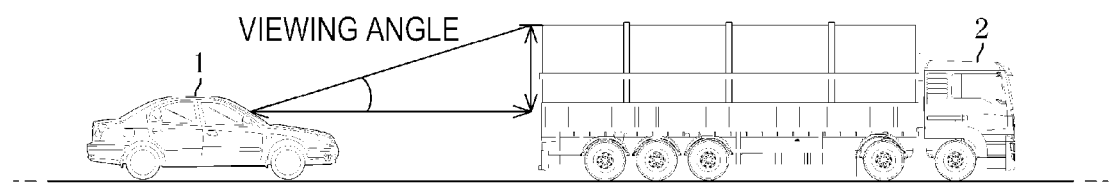
FIG. 4 is a diagram illustrating that a viewing angle is determined using a front camera according to one embodiment.
Figure 5:
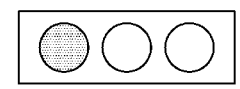
FIG. 5 is a diagram illustrating that a field of view with respect to a traffic light is blocked by a preceding vehicle according to one embodiment.
Figure 5:
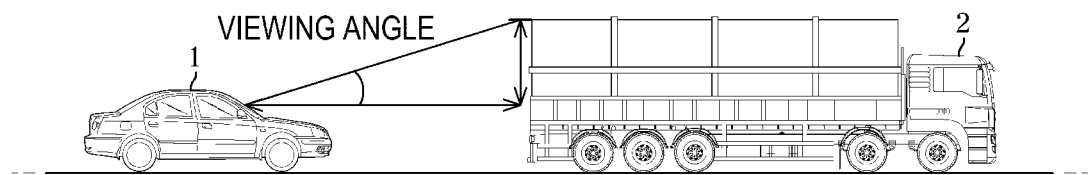

FIG. 4 is a diagram illustrating that a viewing angle is determined using a front camera according to one embodiment. FIG. 5 is a diagram illustrating that a field of view with respect to a traffic light is blocked by a preceding vehicle according to one embodiment.

A vehicle 1 may stop in a section in which a traffic light is present at an intersection or the like while traveling on a road. In this case, there may be a case in which a preceding vehicle 2 is a vehicle with a tall height such as a truck or a bus.

In this case, since there may be a case in which a driver of the vehicle 1 cannot see the traffic light due to a problem of a viewing angle, the viewing angle should be first determined to determine whether a field of view with respect to the traffic light is blocked.

When a front camera 110 detects the preceding vehicle 2, a controller 140 may determine a height of the preceding vehicle 2 and a distance from a host vehicle 1 to the preceding vehicle 2 based on a detection result of the front camera 110.

The controller may determine a viewing angle in the host vehicle 1 based on the determined height of the preceding vehicle 2 and the determined distance from the host vehicle 1 to the preceding vehicle.

In this case, the viewing angle is an angle from a viewpoint of a driver of the host vehicle 1 to a highest point of the preceding vehicle 2 with respect to a horizontal direction.

The controller 140 may determine whether a traffic light is present in front of the host vehicle 1 based on information received from a navigation device 165 receiving road information.

Based on the traffic light ahead determined in this way and the above-described viewing angle in the host vehicle 1, the controller 140 may determine whether the field of view with respect to the traffic light ahead is blocked at a viewpoint of the driver of the host vehicle 1 or whether the driver of the host vehicle 1 is not able to see the traffic light due to the preceding vehicle 2.

When it is determined that the field of view with respect to the traffic light in front of the vehicle 1 is blocked, the controller 140 may calculate a relative speed between the host vehicle 1 and the preceding vehicle 2 based on first sensor data by a first sensor 120.

When the relative speed with the preceding vehicle 2 detected by the first sensor 120 is constant or is decreased, that is, when a distance between the host vehicle 1 and the preceding vehicle 2 is constant or is decreased, the controller 140 may determine that the host vehicle 1 follows the preceding vehicle 2 in a state in which the field of view with respect to the traffic light is blocked, thereby providing a notification of a signal violation warning to the driver.

That is, when driving in accordance with the driving of the preceding vehicle 2 in a state in which the driver of the host vehicle 1 is not able to see the traffic light due to the preceding vehicle 2, since there is a risk of a signal violation and an accident due to the signal violation, a notification of a signal violation warning may be provided to the driver in order to prevent the risk.

Figure 6:
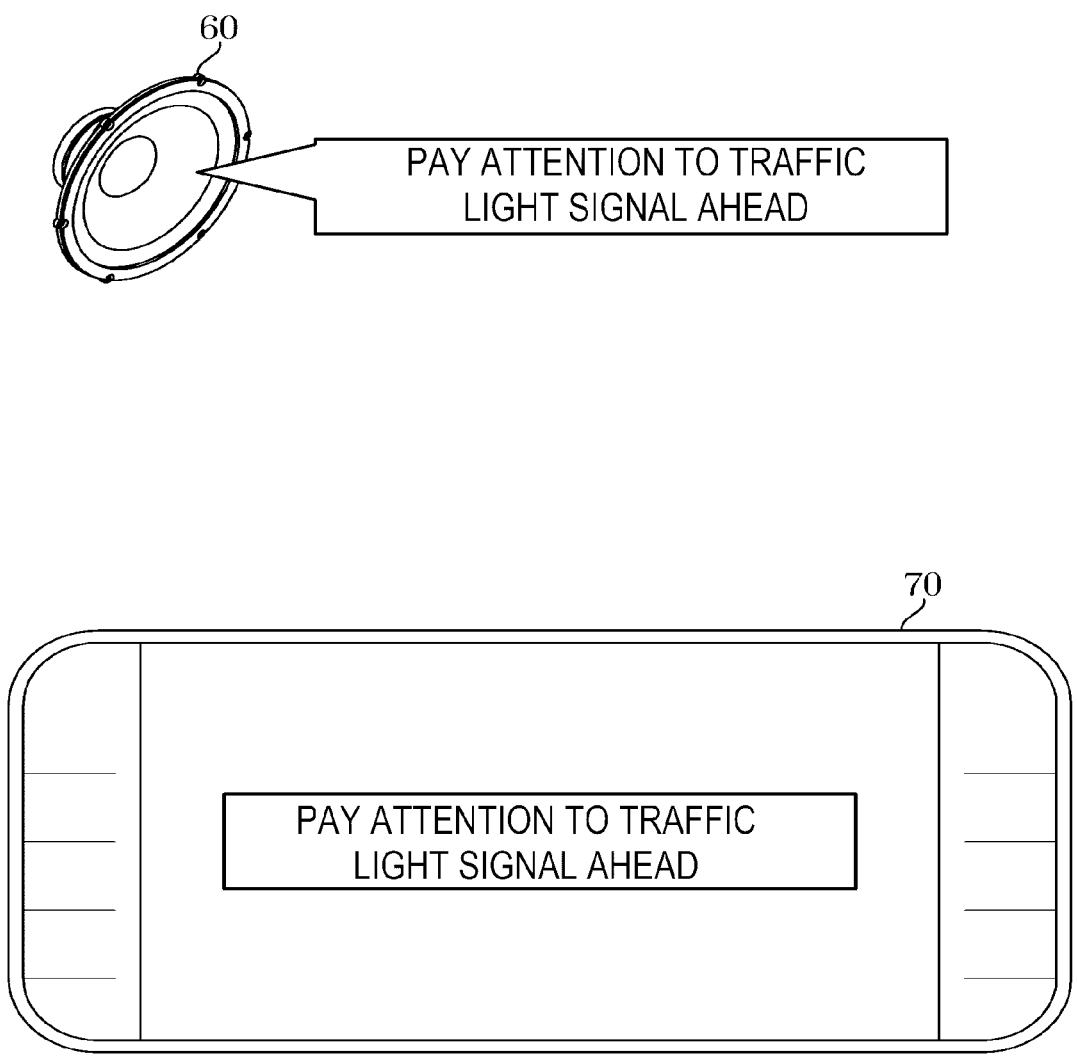
FIG. 6 illustrates that a notification is provided to a driver according to one embodiment.

FIG. 6 illustrates that a notification is provided to a driver according to one embodiment.

The above-described notification of the signal violation warning provided to the driver may be provided in the form of a voice through a speaker 60 or an image through a display 70.

A controller 140 may control the speaker 60 to provide a driver notification in the form of a voice saying "pay attention to a traffic light signal ahead" and may control the display 70 to provide a driver notification of the phrase "pay attention to a traffic light signal ahead" in the form of an image.

The driver may listen to the notification to recognize a possibility of a signal violation and may perform an operation such as braking a vehicle 1.

Even if the driver does not perform braking by himself or herself, whether vehicles at both sides of the vehicle 1 are stopped may be detected to automatically control the vehicle 1, which will be described below.

Figure 7:
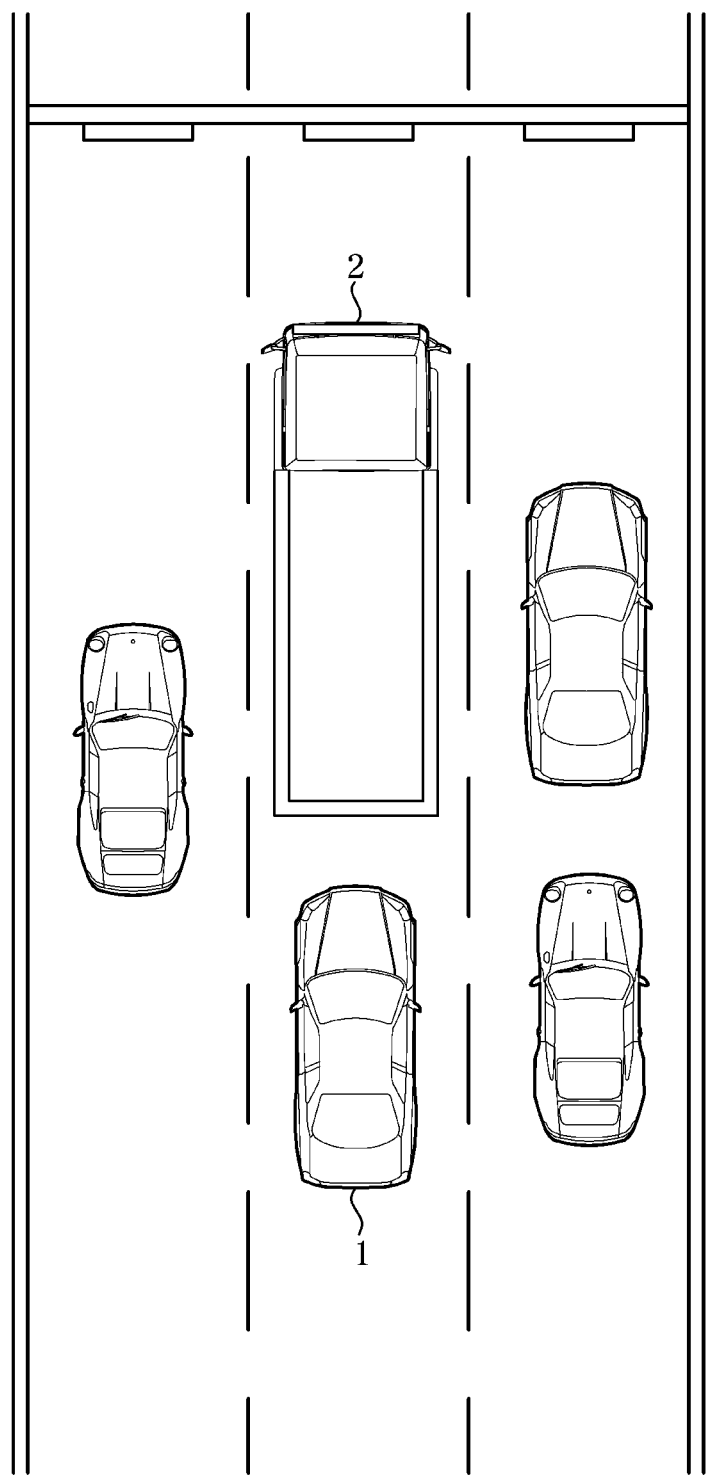
FIG. 7 is a diagram illustrating that vehicles at both sides of a host vehicle are stopped according to one embodiment.
Figure 8:
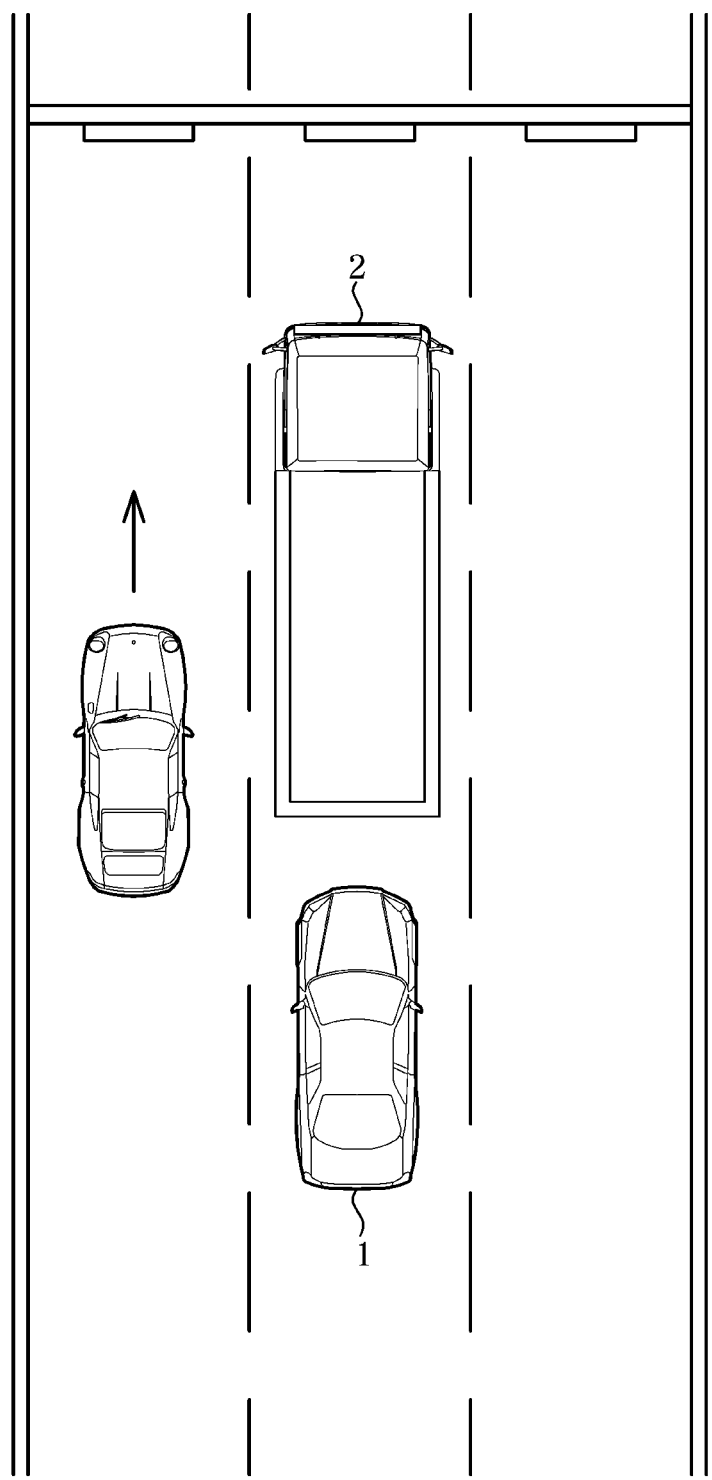
FIG. 8 is a diagram illustrating that vehicles at both sides of a host vehicle are moving according to one embodiment.

FIG. 7 is a diagram illustrating that vehicles at both sides of a host vehicle are stopped according to one embodiment. FIG. 8 is a diagram illustrating that vehicles at both sides of a host vehicle are moving according to one embodiment.

As described above, a controller 140 may determine a viewing angle in a vehicle 1 and may determine whether a field of view with respect to a traffic light is blocked.

When a driver of a host vehicle 1 follows a preceding vehicle 2 in a situation in which a traffic light is not seen, or when vehicles at both sides of a host vehicle 1 are stopped, the controller 140 may determine that the traffic light is a red light, the controller 140 may brakes the host vehicle 1.

In this case, whether the vehicles at both sides of the host vehicle 1 are stopped may be determined based on second sensor data of a second sensor 130.

As described above, the second sensor 130 may be provided in the form of a plurality of corner radars and may acquire data of the vehicles at both sides of the host vehicle 1.

When it is determined that a field of view of the host vehicle 1 with respect to a traffic light is blocked, and in a situation in which the host vehicle 1 follows the preceding vehicle 2, as shown in FIG. 7, when it is determined that the vehicles at both sides of the host vehicle 1 are stopped based on second sensor data, the controller 140 may brake the host vehicle 1 to stop the host vehicle 1.

When it is determined that vehicles at both sides of the host vehicle 1 are moving without stopping in the same situation as shown in FIG. 8, the controller 140 may provide only a notification of a signal violation warning to a driver without braking the host vehicle 1.

Figure 9:
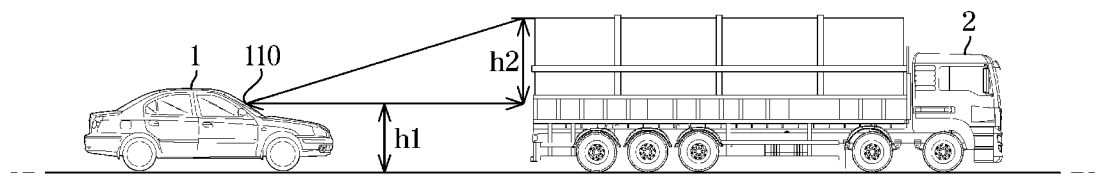
FIG. 9 is a diagram illustrating that a height of a preceding vehicle is determined according to one embodiment.

FIG. 9 is a diagram illustrating that a height of a preceding vehicle is determined according to one embodiment.

There may be a case in which a preceding vehicle 2 in front of a host vehicle 1 is a vehicle with a tall height such as a truck or a bus, and also there may be a case in which the preceding vehicle 2 is a vehicle with a low height such as a general car.

Therefore, a controller 140 may first determine a height of the preceding vehicle 2, and only when the height of the preceding vehicle 2 is greater than or equal to a certain value (preset value), the controller 140 may determine a viewing angle in the host vehicle 1.

In determining the height of the preceding vehicle 2, first, an installation height h1 of a front camera 110 may be considered. In addition to the installation height h1 of the front camera 110, a height h2 from the front camera 110 to a top of the preceding vehicle 2 may be further considered to calculate a height h1+h2 of the preceding vehicle 2.

When the height of the preceding vehicle 2 is determined to be greater than or equal to the preset value, since a field of view with respect to a traffic light may be blocked, the viewing angle in the host vehicle 1 may be determined to determine whether the field of view with respect to the traffic light is blocked.

Since a vehicle such as a typical car is designed to have a height of 2 m or less, the preset value may be 2 m.

That is, when the height of the preceding vehicle 2 is determined, and the height h1+h2 is 2 m or more, the controller 140 may determine that a field of view of the driver of the host vehicle 1 with respect to the traffic light may be blocked due to the height of the preceding vehicle 2, thereby determining the viewing angle in the host vehicle 1 and whether the field of view with respect to the traffic light is blocked.

The preset value of 2 m is merely exemplary and may be set to various values.

Figure 10:
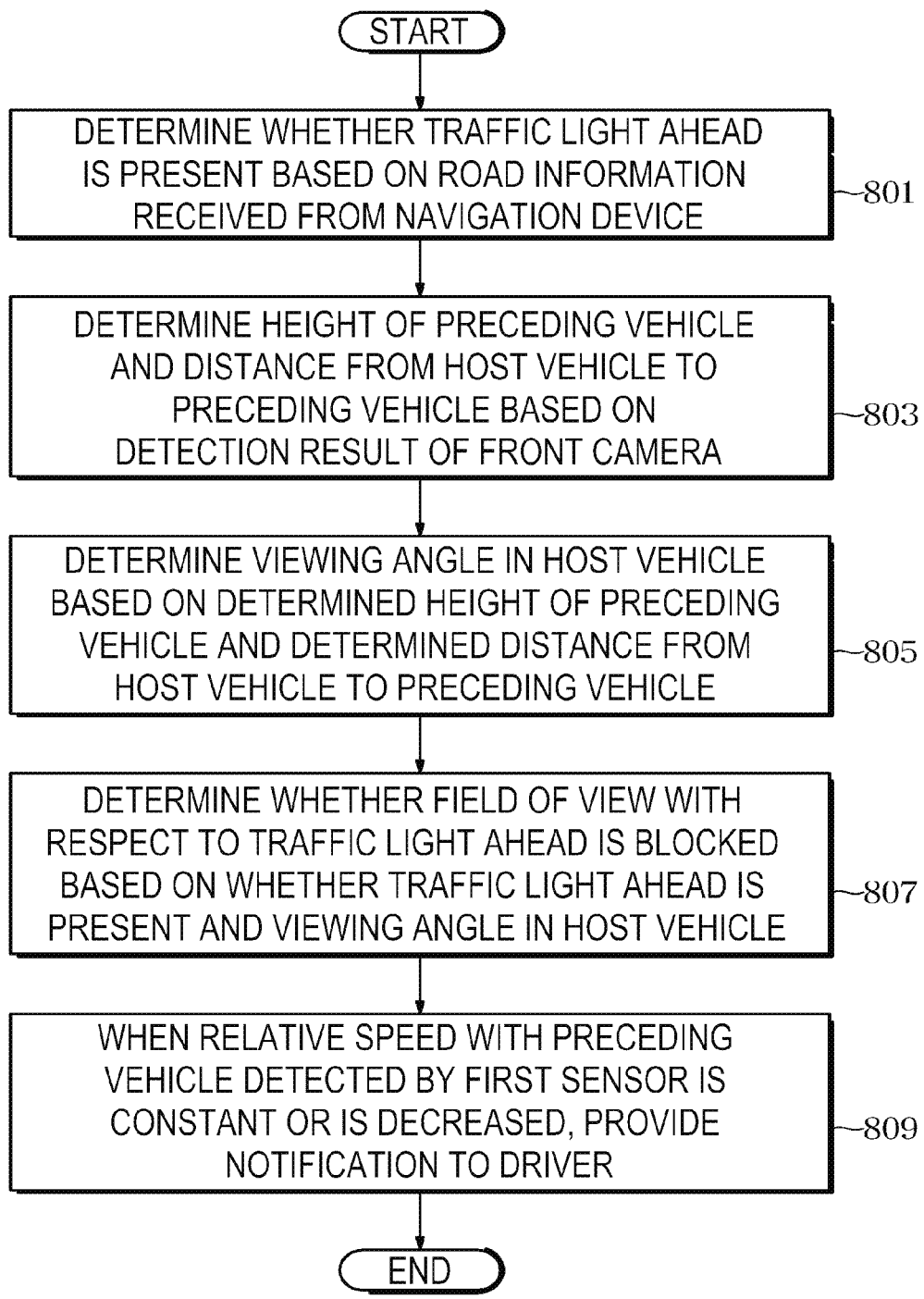
FIG. 10 is a flowchart of a driver assistance method according to one embodiment.

FIG. 10 is a flowchart of a driver assistance method according to one embodiment.

Whether a traffic light is present in front of a vehicle 1 may be determined based on road information received from a navigation device (801).

Based on a detection result of a front camera 110, a height of a preceding vehicle 2 and a distance from a host vehicle 1 to the preceding vehicle 2 may be determined (803).

A viewing angle in the host vehicle 1 may be determined based on the determined height of the preceding vehicle 2 and the determined distance from the host vehicle 1 to the preceding vehicle.

Whether a field of view with respect to the traffic light ahead is blocked may be determined based on the presence or absence of the traffic light ahead and the viewing angle in the host vehicle 1 (807).

When it is determined that a field of view of a driver of the host vehicle 1 with respect to the traffic light ahead is blocked, and when a relative speed with the preceding vehicle 2 detected by a first sensor is constant or is decreased, a notification of a signal violation warning may be provided to the driver (809).

The notification to the driver may be provided in the form of a voice through a speaker or the form of an image through a display.

When it is determined that the field of view with respect to the traffic light is blocked, whether vehicles at both sides of the host vehicle 1 are stopped may be determined by a second sensor.

As a determination result, when it is determined that the vehicles at both sides of the host vehicle 1 are stopped, the host vehicle 1 may be controlled to be stopped.

As described above, a notification is provided to the driver of the host vehicle 1 by recognizing a situation in which the traffic light is not visible, and automatic braking control is performed on the host vehicle 1 when necessary, thereby reducing a risk of a signal violation by the driver of the host vehicle 1 and also reducing a risk of an accident due to the signal violation.

According to one aspect of the present disclosure, there can be provided a DAS which, when there is a possibility of signal violation due to a field of view with respect to a traffic light being blocked, provides a notification to a driver to deal with the signal violation, and a driver assistance method.

Meanwhile, the disclosed embodiments can be implemented with recording media storing computer-executable instructions. The instructions can be stored in the form of program code and generate, when executed by a processor, a program module such that the operation of the disclosed embodiments can be performed. The recording media can be implemented as computer-readable recording media.

The computer-readable recording media include any of recording media in which instructions that can be interpreted by a computer are stored. Examples of the computer-readable recording media include a read only memory (ROM), a RAM, a magnetic tape, a magnetic disk, a flash memory, an optical data storage device, and the like.

The disclosed embodiments have been described above with reference to the accompanying drawings. Those of ordinary skill in the art to which the present disclosure pertains will appreciate that the present disclosure can be carried out in forms different from the disclosed embodiments without changing the technical spirit or essential characteristics of the present disclosure. The disclosed embodiments are exemplary and should not be interpreted as restrictive.

What is claimed is:

1. A driver assistance system comprising:
   a front camera configured to detect a preceding vehicle;
   a controller configured to:
      determine whether a traffic light ahead is present based on road information received from a navigation device installed in a host vehicle;
      determine a height of the preceding vehicle and a distance from the host vehicle to the preceding vehicle based on a detection result of the front camera;
      determine a viewing angle blocked by the preceding vehicle based on the determined height of the preceding vehicle and the distance from the host vehicle to the preceding vehicle; and
      determine whether a field of view with respect to the traffic light ahead is blocked based on the traffic light ahead being present and the viewing angle blocked by the preceding vehicle; and
   a first sensor configured to detect vehicles at both sides of the host vehicle,
   wherein the controller is configured to determine whether the vehicles at both sides of the host vehicle are stopped based on a detection result of the first sensor, and
   wherein, upon determining that the vehicles at both sides of the host vehicle are stopped, the controller is configured to control the host vehicle to be stopped.

2. The driver assistance system of claim 1, further comprising a second sensor configured to detect a relative speed with the preceding vehicle,
   wherein, upon determining that the field of view with respect to the traffic light ahead is blocked, based on the relative speed with the preceding vehicle detected by the second sensor being constant or decreased, the controller is configured to provide a notification to a driver.

3. The driver assistance system of claim 2, further comprising:
   a speaker; and
   a display,
   wherein the controller is configured to controls the speaker or the display to provide the notification to the driver.

4. The driver assistance system of claim 1, wherein, upon determining that the vehicles at both sides of the host vehicle are not stopped, the controller is configured to provide the notification to the driver.

5. The driver assistance system of claim 1, wherein the controller is configured to determine a height of the preceding vehicle based on an installation height of the front camera and a top of the preceding vehicle detected by the front camera.

6. The driver assistance system of claim 1, wherein, based on a height of the preceding vehicle being greater than or equal to a preset value, the controller is configured to determine the viewing angle blocked by the preceding vehicle.

7. The driver assistance system of claim 6, wherein, upon determining that the field of view with respect to the traffic light ahead is blocked, the controller is configured to control the host vehicle to be stopped.

8. A driver assistance method comprising:
receiving road information;
detecting a preceding vehicle;
determining whether a traffic light ahead is present based on the received road information;
determining a height of the preceding vehicle and a distance from a host vehicle to the preceding vehicle based on a result of detecting the preceding vehicle;
determining a viewing angle in the host vehicle based on the determined height of the preceding vehicle and the determined distance from the host vehicle to the preceding vehicle;
determining whether a field of view with respect to the traffic light ahead is blocked based on the traffic light ahead being present and the viewing angle blocked by the preceding vehicle;
detecting vehicles at both sides of the host vehicle;
determining whether the vehicles at both sides of the host vehicle are stopped based on a result of detecting the vehicles at both sides of the host vehicle; and
upon determining that the vehicles at both sides of the host vehicle are stopped, controlling the host vehicle to be stopped.

9. The driver assistance method of claim 8, further comprising detecting a relative speed with the preceding vehicle; and
upon determining that the field of view with respect to the traffic light ahead is blocked, based on the relative speed with the preceding vehicle being constant or decreased, providing a notification to a driver.

10. The driver assistance method of claim 9, wherein the providing of the notification to the driver includes controlling a speaker or a display to provide the notification to the driver.

11. The driver assistance method of claim 8, further comprising, upon determining that the vehicles at both sides of the host vehicle are not stopped, providing the notification to the driver.

12. The driver assistance method of claim 8, wherein the determining of the height of the preceding vehicle includes determining the height of the preceding vehicle based on an installation height of a front camera and a top of the preceding vehicle detected by the front camera.

13. The driver assistance method of claim 8, further comprising, based on a height of the preceding vehicle being greater than or equal to a preset value, determining the viewing angle blocked by the preceding vehicle.

14. The driver assistance method of claim 13, further comprising, upon determining that the traffic light ahead is blocked, controlling the host vehicle to be stopped.

15. A driver assistance system comprising:
a front camera configured to detect a preceding vehicle;
a controller configured to:
determine whether a traffic light ahead is present based on road information received from a navigation device installed in a host vehicle;
determine a viewing angle blocked by the preceding vehicle based on a detection result of the front camera; and
determine whether a field of view of the traffic light ahead is blocked based on whether the traffic light ahead is present and the viewing angle blocked by the preceding vehicle; and
a first sensor configured to detect vehicles at both sides of the host vehicle,
wherein the controller is configured to determine whether the vehicles at both sides of the host vehicle are stopped based on a detection result of the first sensor, and
wherein, upon determining that the vehicles at both sides of the host vehicle are stopped, the controller is configured to control the host vehicle to be stopped.

16. The driver assistance system of claim 15, wherein, upon determining that the field of view with respect to the traffic light ahead is blocked, the controller is configured to provide a notification to a driver.

* * * * *